United States Patent [19]

Ohno

[11] Patent Number: 4,575,478

[45] Date of Patent: Mar. 11, 1986

[54] TONER FOR USE IN ELECTROPHOTOGRAPHY

[75] Inventor: Junichi Ohno, Nagoya, Japan

[73] Assignee: Toray Industries, Tokyo, Japan

[21] Appl. No.: 611,526

[22] Filed: May 17, 1984

[30] Foreign Application Priority Data

May 17, 1983 [JP] Japan .................. 58-86327

[51] Int. Cl.[4] .............................. G03G 9/06
[52] U.S. Cl. .................... 430/109; 430/137
[58] Field of Search .......... 430/49, 302, 303, 137; 428/447; 101/457

[56] References Cited

U.S. PATENT DOCUMENTS 4,020,761 12/1975 Ogiwara et al. ............... 428/496
4,259,905 4/1981 Abiko et al. .................... 430/49
4,308,799 1/1982 Kitagawa ........................ 428/447

FOREIGN PATENT DOCUMENTS 1803 3/1975 Japan .
76104 2/1977 Japan .
29305 6/1977 Japan .

*Primary Examiner*—John L. Goodrow
*Attorney, Agent, or Firm*—Scully, Scott, Murphy & Presser

[57] ABSTRACT

Provided is a toner for use in electrophotography comprising (A) an epoxy resin or a modified epoxy resin obtained by the reaction of an epoxy resin with a polyfunctional compound having at least two carboxyl or amino groups per molecule, and (B) a bivalent or polyvalent metal complex compound or a bivalent or polyvalent metal salt.

16 Claims, No Drawings

TONER FOR USE IN ELECTROPHOTOGRAPHY

BACKGROUND OF THE INVENTION

The present invention relates to a toner for use in an electrophotography, and more particularly to a toner for use in an electrophotography, which has high bonding strength to an ink-repellent surface such as a dry planographic printing plate in particular and can improve the printing durability of the printing plate.

The dry planographic printing plate for use in an electrophotographic system comprises a substrate such as paper and an ink-receptive toner deposited imagewise thereon by an electrophotographic process the surface of said substrate being coated with an ink-repellent material such as silicone. In printing with such a printing plate, inking is directly made all over the surface of the printing plate without using any fountain solutions, whereby ink does not adhere to the silicone-coated surface, but adheres only to the imagewise toner, so that the ink image is transferred to paper and printing is effected.

Thus, the printing with the dry planographic printing plate according to the electrophotographic process does not require the fountain solution and in addition the plate making can be easily done without etching treatment. Therefore this method might be quite epoch-making if good printed matters could be obtained without causing any troubles. In fact, however, there are various difficulties arising from the use thereof. One of the major problems is that the ink-repellent materials repel not only ink, but also other materials such that they repel even the toner to be deposited and to form image areas, resulting in lowered bonding strength, dropout of the toner in printing and remarkable reduction in the printing durability of the printing plate. Therefore, attempts have been made to modify silicone or fluorocarbon polymer constituting the ink-repellent coating layer in order to improve adhesion between the plate and the toner. Among them, a typical attempt is to introduce a polar group affinitive with the toner into the ink-repellent layer, as disclosed in, for example, Japanese Pat. Laid-Open Nos. 1803/1975, 29305/1977 and 76104/1977, and U.S. Patent Nos. 4,020,761 and 4,259,905.

The formation of a toner image on the dry planographic printing plate according to the electrophotographic process is currently carried out by using conventional toners and no special toners therefor are used. Namely, it is not too much to say that studies on a toner suited for dry planographic printing process have scarcely been made, though attempts to find out a suitable printing plate therefor have been made. Conventional toners are formulated so as to be able to adhere to ordinary cellulose-based paper or coated papers (including conventional plate materials) having a relatively hydrophilic surface so that it cannot be thought that they have a similar affinity with an ink-repellent or hydrophobic surface. Many of conventional toners are epoxy, alkyd or styrene resins, or modified resins thereof. These toners have disadvantages in that they have poor adhesion to a dry planographic printing plate and in some case even several tens of copies can not be printed.

SUMMARY OF THE INVENTION

An object of the present invention is to provide a toner for use in electrophotography, which has good affinity with an ink-repellent surface.

Another object of the present invention is to provide a toner for use in electrophotography, which has high bonding strength to a dry planographic printing plate and can improve the printing durability of the printing plate.

The present invention resides in a toner for use in electrophotography, which comprises:

(A) an epoxy resin or a modified epoxy resin obtained by reacting the epoxy resin with a polyfunctional compound having two or more carboxyl or amino groups per molecule, and (B) a bivalent or polyvalent metal complex compound or a bivalent or polyvalent metal salt

DESCRIPTION OF THE PREFERRED EMBODIMENTS

The epoxy resin which can be used in the present invention includes, above all, a bisphenol A type epoxy resin of formula (I)

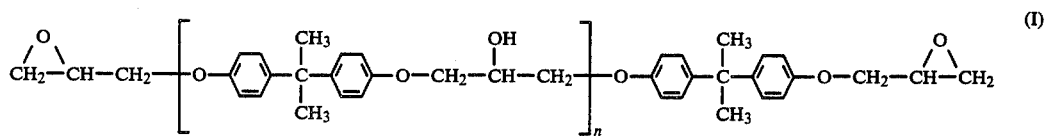

wherein n is 0 to 12.

Examples of such epoxy resins include commercially available Epikote resins (products of Yuka Shell Epoxy K.K.). All epoxy resins ranging from Epikote 828 (epoxy equivalent of 184 to 194, molecular weight of about 380) to Epikote 1009 (epoxy equivalent of 2400 to 3300, molecular weight of about 3750) can be used and commercially available Epikote-like resins as well as corresponding epoxy resins made elsewhere can be used as the epoxy resin. Other examples of the epoxy resins include those in which novolak is used in place of bisphenol A and those into which epoxy groups have been introduced by treating the unsaturated group of an unsaturated compound such as cyclopentadiene, cyclohexene, polybutadiene or drying oil with peracetic acid. These epoxy resins have different properties from those of the bisphenol A resins.

Examples of the novolak type epoxy resins include those of formula (II)

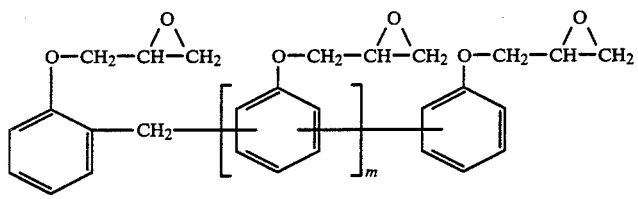

(II)

wherein m is 0 to 8.

In addition to the epoxy resins described above, there may be used other epoxy resins such as diglycidyl terephthalate (trade name: Nissan Blemmer DGT, a product of Nippon Oil & Fats Co., Ltd.), bisphenol S diglycidyl ether (trade name: DENACOL EX 251, a product of Nagase Kasei Co., Ltd), spiroglycol diglycidyl ether (trade name: DENACOL EX 231, a product of Nagase Kasei Co., Ltd.), and tris (epoxypropyl) isocyanurate (trade name: NISSAN TEPIC, a product of Nissan Chemical Industries, Ltd.) in order to improve the physical and electrical properties of the toner or to improve adhesion to a special silicone rubber layer.

Now the description will be made of modified epoxy resins obtained by reacting an epoxy resin with a polyfunctional compound having two or more carboxyl or amino groups per molecule.

The above-described epoxy resins can be used as the unmodified epoxy resins for the production of the modified epoxy resins.

As polycarboxylic acids having two or more carboxyl groups per molecule, those having two to four carboxyl groups and 2 to 60 carbon atoms are generally used.

Examples of the polycarboxylic acids include unsaturated dicarboxylic acids such as maleic acid, fumaric acid, citraconic acid, itaconic acid, tetrahydrophthalic acid, or methyltetrahydrophthalic acid; and aromatic dicarboxylic acids and aliphatic or alicyclic saturated dicarboxylic acids such as phthalic acid, isophthalic acid, hexahydrophthalic acid, malonic acid, succinic acid, adipic acid, sebacic acid, azelaic acid, chlorendic acid, and tetrachlorophthalic acid.

Further, there can be used carboxyl group-terminated polycarboxylic acids which are esterification reaction products derived from one mol of a polyhydric alcohol and two mol of an anhydride derived from a tricarboxylic acid or an aliphatic or aromatic dicarboxylic acid containing two or more carboxyl groups per molecule in order to modify the above epoxy resins. Typical examples of such carboxylic acid anhydrides include maleic anhydride, succinic anhydride, phthalic anhydride, and trimellitic anhydride. Examples of the polyhydric alcohols to be reacted with the acid anhydride include ethylene glycol, triethylene glycol, 1,4-butanediol, 1,5-pentanediol, 1,6-hexanediol, 1,3-butanediol, 2,3-butanediol, neopentyl alcohol, 2-ethyl-1,3-hexanediol, 2,2,4-trimethylpentanediol, hydrogenerated bisphenol A, butenediol (1,4), benzenedimethanol (1,3), cyclohexyldimethanol (1,4), cyclohexyldimethanol (1,3), N-methyldiethanolamine, N-ethyldiethanolamine, N-butyldiethanolamine, N-phenyldiethanolamine, 1:1 type lauric acid diethanolamide [$C_{11}H_{23}CON$ $(CH_2CH_2OH)_2$; trade name: Prophane AA62EX, a product of Sanyo Chemical Industries, Ltd.], bisphenol dioxyethyl ether, ethylene oxide (2.6 mol) adduct of bisphenol A (trade name: NISSANUNIOL DA-350F, a product of Nippon Oil & Fats Co., Ltd.), bisphenol dioxylpropyl ether, propylene oxide (2.2 mol) adduct of bisphenol A (trade name: NISSANUNIOL DB-360, a product of Nippon Oil & Fats Co., Ltd.), 1,3-dimethylolurea, dimethylolethyleneurea, and N,N'-bis(2-hydroxyethyl)piperazine.

Examples of preferred polycarboxylic acids are maleic acid, fumaric acid, tetrahydrophthalic acid, malonic acid and chlorendic acid. Preferred examples of the carboxyl group-terminated compounds derived from the reaction of a diol with an acid anhydride are reaction products of maleic anhydride with cyclohexyldimethanol (1,4), 1,4-butanediol, N-(n-butyl)diethanolamine or 1:1 type lauric acid diethanolamide.

As polyamines having two or more amino groups per molecule, there can be used those having two to four amino groups (—NH$_2$) and/or imino groups (>NH) per molecule and 2 to 16 carbon atoms.

Examples of such amines include aliphatic diamines such as ethylenediamine, 1,3-diaminopropane, 1,4-diaminobutane, 1,6-hexamethylenediamine, diethylenetriamine, triethylenetetramine, N-ethanolethylenediamine, N,N'-dimethylethylenediamine and N-ethylethylenediamine; aromatic diamines such as o-, m- or p-phenylenediamine, diaminodiphenylmethane, diaminodiphenyl sulfone, diaminodiphenyl ether, o-, m- or p-xylenediamine and 1,2-diphenyldiamine; and alicyclic diamines such as piperazine, N-(2-aminoethyl)piperazine, and N,N'-bis(3-aminopropyl)piperazine.

Among them, preferred polyamines are triethylenetetramine, m-phenylenediamine, 4,4'-diaminodiphenyl ether, piperazine and N-(2-aminoethyl)piperzaine.

Methods for modifying the epoxy resins will now be described.

The modification of the epoxy resin is accomplished by reacting the polycarboxylic acid or the polyamine with the epoxy group of the epoxy resin. For example, the reaction proceeds as follows, when an epoxy compound and piperazine are used.

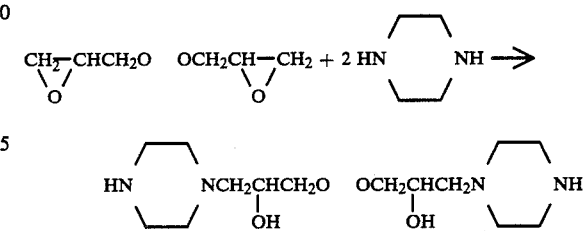

The reaction formula shows the case where the molar ratio of piperazine to the epoxy compound is 2 and the main product is a condensate of two mol of piperazine with the epoxy compound. In addition, there is formed a small quantity of a high-molecular compound having imino groups at both terminals wherein two or more molecules of the epoxy compound and piperazine are alternately condensed. When the molar ratio of piperazine to the epoxy compound is between 2 and 1, there is formed a high-molecular compound containing two or more reacted epoxy compounds in the molecule and reacted piperazine at both terminal. As the molar ratio approaches 1, the molecular weight of the reaction product is increased. When the molar ratio is 1 or below, the curing reaction of the epoxy resin takes place unfavorably.

When the polycarboxylic acid is used, a reaction between -COOH and

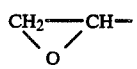

takes place and

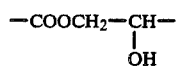

is formed. The mode of the reaction is similar to that of the polyamine.

As the epoxy resin to be modified, the above-described bisphenol A type or novolak type epoxy resins are used.

In order to improve the powder physical properties and the electrical characteristics of the resin for the toner, a product obtained by the reaction of two or more epoxy compounds or epoxy resins, hereinafter referred to as (a), mainly other than bisphenol A type or novolak type epoxy resins. For example, a relatively low-molecular epoxy compound having two or more epoxy groups or an epoxy resin is first reacted with the above-described polycarboxylic acid or polyamine to synthesize a dicarboxylic acid-modified or diamine-modified epoxy compound or resin which is then reacted with the above-described high-molecular bisphenol A type epoxy resin, hereinafter referred to as (b), to obtain a dicarboxylic acid-modified or diamine-modified epoxy resin in which both terminals of the molecule are modified with the dicarboxylic acid or the diamine.

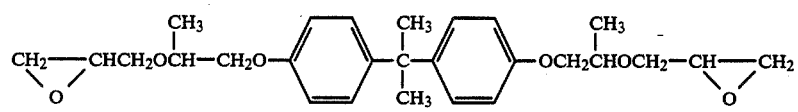

The resulting modified epoxy resin may be used to improve said powder physical properties and electrical characteristics. In an embodiment of the resulting modified epoxy resin obtained from an ideal reaction, the components (a) and (b) are alternately arranged with the diamine or the dicarboxylic acid interposed therebetween. It will, of course, be understood that the components (a) and (b) may be randomly arranged, for example, by previously mixing the components (a) and (b) and then carrying out the reaction.

Examples of the epoxy resins corresponding the component (a) include ethylene glycol diglycidyl ether (trade name: DENACOL EX811, EX812, a product of Nagase Chemical, Ltd.), polyethylene glycol diglycidyl ether (trade name: DENACOL EX820, EX821, a product of Nagase Chemical, Ltd.), propylene glycol diglycidyl ether (DENACOL EX910 or EX911), polypropylene glycol diglycidyl ether, neopentyl glycol diglycidyl ether, 1,6-hexaneglycol diglycidyl ether, hydrogenated bisphenol A diglycidyl ether, and condensation products obtained from a longchain dibasic acid and epichlorohydrin, represented by the formula:

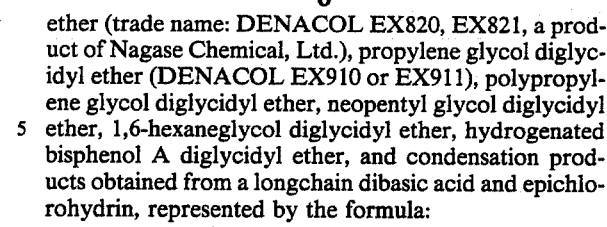

wherein R is —$CH_2CH(C_6H_{10})CH$-$CH(C_6H_{10})CH_2$—(-trade name: OS RESIN 101, a product of Okamura Seiyu Co., Ltd.), R is

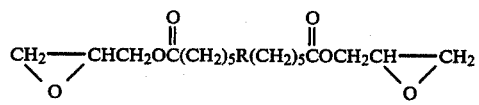

(trade name: OS RESIN 102), and R is

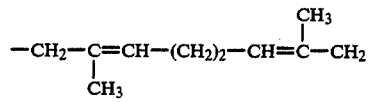

(trade name: OS RESIN 103).

There can be also used diglycidyl ether which is a bisphenol A type addition product of two mol of propylene oxide, represented by the formula:

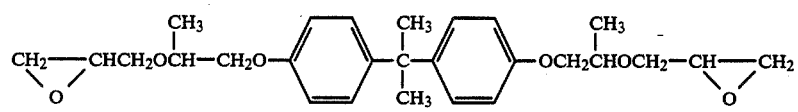

(trade name: EPORAITO Series 3002, a product of Kyoeisha Yusi Chemical Industries, Ltd.), diglycidyl terephthalate (trade name: NISSAN BLEMMER DGT, a product of Nippon Oil & Fats Co., Ltd.), and diglycidyl ortho-phthalate (trade name: NISSAN BLEMMER DGP). Further, there can be similarly used low-molecular bisphenol A type epoxy resin of the formula:

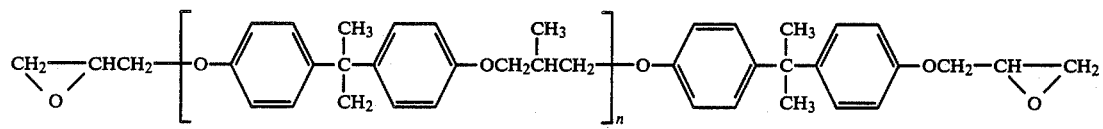

wherein n is 0 to 3 (trade name; Epikote 807, 828, 834, products of Yuka Shell Epoxy K.K.).

Since both terminals of the modified epoxy resin must be carboxyl group-terminated or amino group-terminated, it is desirable to react the epoxy resin with the polycarboxylic acid or the polyamine in a molar ratio of the polycarboxylic acid or the polyamine to the epoxy resin of 1 or higher, preferably 1.1 to 2.0, particularly 1.4 to 1.8.

The reaction for modifying the epoxy resin can be carried out in the absence of any solvent, but it is preferred to carry out the reaction in a non-alcoholic strongly polar solvent such as 1,4-dioxane, butyl acetate or methyl butyl ketone at a temperature of 80 to 130° C. in order to inhibit local geletion and to allow the reaction to proceed smoothly under uniform and low viscosity conditions. In order to facilitate the reaction, tetraethylammonium bromide, triethylamine hydrochloride, diethylamine hydrochloride or 2-ethylimidazole is added as an oxirane ring-opening catalyst in the reaction of the epoxy resin with the carboxylic acid, and water or an alcohol is added in the reaction of the epoxy resin with the amine. The catalyst is added in a quantity of 0.01 to 5 mol% based on that of the oxirane ring and the reaction is completed in 4.5 to 8 hr.

Now the bivalent or polyvalent metal complex compounds and metal salts to be used in the present invention will be described.

A metal complex compound or a metal salt is indispensable for the epoxy resin and the reaction product of the epoxy resin with the dicarboxylic acid or the diamine, i.e., the carboxylic acid-modified or the amine-modified epoxy resin to exert a sufficient bonding strength with the surface of a dry planographic printing plate (see, for example, U.S. Pat. Nos. 4,259,905 and 4,308,799 hereinbelow). When only the epoxy resin or the modified epoxy resin is used, the bonding strength of the resin to the surface of the dry planographic printing plate (for use in direct plate making) is very poor. Metals which can be used are bivalent or polyvalent ones. Examples of such metals include calcium, barium, magnesium, zinc, copper, aluminum, tin, cobalt, iron, chromium, manganese, molybdenum, nickel, titanium, zirconium, lead and vanadium.

Among them, trivalent or polyvalent metals are preferred, and aluminum, cobalt, iron, manganese and titanium are particularly preferred.

As the metal complex compound, acetylacetonatometal chelates are preferred. Examples of such chelates include aluminum acetylacetonate, cobalt (II) acetylacetonate, chromium acetylacetonate, copper (II) acetylacetonate, iron (II) acetylacetonate, manganese (II) acetylacetonate, manganese (III) acetylacetonate, molybdenum oxyacetylacetonate, nickel acetylacetonate, tiatanium (IV) oxyacetylacetonate, zinc acetylacetonate, zirconium acetylacetonate, aluminum monoacetylacetonate bis(ethyl acetoacetate) (trade name: ALUMICHELATE D, a product of Kawaken Fine Chemicals Co., Ltd.) and aluminum tris(ethyl acetate) (trade name: ALCH-TR, a product of Kawaken Fine Chemicals Co., Ltd.). Among them, acetylacetonate compounds of aluminum, cobalt (III) and iron (III) are preferred.

As the bivalent or polyvalent metal salts, those of carboxylic acids having 1 to 12 carbon atoms or metal chlorides are preferred. Examples of such metal salts include magnesium acetate, calcium acetate, barium acetate, aluminum acetate, stannous acetate, zirconium hydroxyacetate, chromium acetate, manganese acetate, manganese oxalate, barium oxalate, nickel acetate, zirconium hydroxyacetate, nickel formate, iron (III) acetate, copper acetate, zinc acetate, and ferric chloride.

Among them, metal salts of carboxylic acids having 1 to 3 carbon atoms, such as barium acetate, barium oxalate, zirconium hydroxyacetate, iron (III) acetate and zinc acetate are preferred.

These metal complex compounds or metal salts are added in a quantity of 0.5 to 15 parts per 100 parts of the epoxy resin or the modified epoxy resin, thus obtaining a resin having printing durability and strong adhesion to, for example, special ink-repellent silicone rubber. The preferred amount is 2 to 8 parts per 100 parts of the epoxy resin or the modified epoxy resin.

The toner exhibits a satisfactory effect by the use of these resins and adhesion accelerators. However, a silane coupling agent may be added to the toner in order to accelerate adhesion to the special silicone rubber-coated printing plate by improving the wettability of the toner. Examples of such silane coupling agents include γ-glycidoxypropyltrimethoxysilane, γ-methacryloxypropyltrimethoxysilane, γ-mercaptopropyltrimethoxysilane, γ-aminopropyltriethoxysilane, and N-(β-aminoethyl)-γ-aminopropyltrimethoxysilane. Preferably, the silane coupling agent is added in a quantity of 0.2 to 8 parts by weight per 100 parts by weight of the resin.

If necessary, the obtained resin for the toner may be mixed with a colorant, charge controlling agent, or the like, and finely divided to form a positively or negatively chargeable dry or wet toner. If desired, conventional toner resins or additives may be kneaded or mixed with the toner resin of the present invention.

In the production of the toner, carbon black, various dyes and color pigments are used as colorant, but it is not always necessary to use the colorant when the toner is used as the image area of the printing plate. This is because the toner is inked and ink on the toner then transferred to a printing paper to make a print. The control of the positive or negative charge of the toner is generally conducted by using a charge controlling agent. Electrondonating Nigrosine dyes, amines, and amides can easily impart positive-chargeability to the toner, and metal soaps, chlorinated paraffin, and monoazo dye metal complex can impart negative-chargeability. Surfactants and various conventional charge controlling agents can be used. Further, conventional additives which improve process characteristics and image characteristics can be added. For example, fluidizing agent, cleaning agent, anti-fogging agent, offset preventing agent for fixing rollers, image spreading preventive, electric charge stabilizer, or degradation inhibitor may be used.

A dry toner is composed of 60 to 90 parts by weight of the resin component, 0 to 20 parts by weight of the colorant and 0 to 20 parts by weight of the charge controlling agent. There is a case where the colorant and the charge controlling agent are the same compound as in Nigrosine.

It is possible that magnetic iron oxide or a magnetic powder such as magnetic iron powder, the resin of the present invention and optionally the above-described additives are kneaded and finely divided to form a one-component magnetic toner having electrical conductivity imparted thereto. This magnetic toner can be used as a carrier for the magnetic powder-free toner of the present invention by adjusting the composition of the magnetic toner.

A developing method wherein a charged toner is carried to the surface of a charged body or a photoconductive body where a latent image has been formed includes magnetic brush developing and cascade developing as a dry process and a carrier which carries the toner to the surface of the latent image is used. Examples of such carriers include inorganic powders such as glass ball, iron powder, iron oxide powder, silica and alumina and said inorganic powders coated with a polymer. Carriers obtained by kneading various polymers with iron powder and finely dividing them can be also used.

The particle size of the toner is 5 to 40μ and that of the carrier is 15 to 300μ. Particularly, a combination of the toner having a particle size of 5 to 20μ with the carrier having a fine particle size (20 to 50μ) similar to that of the toner may be used.

The toner of the present invention can be used irrespective of the type of an image-forming system. It can be used in a dry or wet development process as well as PPC or CPC image forming system irrespective of the type of photoconductive body, the transferring system of an electrostatic latent image or toner image.

The toner of the present invention is highly functional in that it has high affinity for a planographic printing plate having a silicone or fluorocarbon resin layer as a surface-coated layer thereon and has an ability to fix on the surface of ordinary paper or processed sheet. The toner is formulated so as to be bonded to the surface of an ink-repellent silicone or fluorocarbon resin, but cannot always be firmly bonded to all kinds of silicone or fluorocarbon resins. For example, the adhesion of the toner to a rubber composed of only dimethylpolysiloxane unit or a silicone oil-coated surface is poor, because microscopic islands to which the polar group of the toner can be bonded by affinity do not exist in the polymer of the coated surface, or components to be bonded do not have sufficient cohesion.

Examples of preferred plate materials having a silicone or fluorocarbon resin layer include:

(1) the one disclosed in Japanese Patent Laid-Open No. 49598/1982 and U.S. Pat. No. 4,308,799, wherein a composition containing three components, i.e., an organopolysiloxane, an alkoxysilane having one or more polar groups and an organozirconium or organotitanium compound having a metaloxygen linkage as essential components is provided on a substrate, (2) the one disclosed in U.S. Pat. No. 4,259,905 wherein the coating film layer of the plate material is mainly composed of a reaction product of a polymer having at least two OH groups per molecule with an organopolysiloxane having OH groups at its terminals, (3) the one disclosed in Japanese Patent Publication No. 42286/1979 (Japanese Patent Laid-Open No. 29305/1977), having a cured silicone composition film layer having an organosiloxane unit containing reactive organic groups, (4) the one disclosed in U.S. Pat. No. 4,009,032, containing a hetero-phase polymer composition containing a copolymer obtained by copolymerizing an organic block with a siloxane polymer block as a coated layer, and (5) the one disclosed in U.S. Pat. No. 4,074,009, having a fluorocarbon compound on a substrate as a coated layer.

Any of these materials is obtained by blending a polymer having a polar group or a compound having a polar block, grafted block, aromatic group or polar group containing oxygen, sulfur, nitrogen and/or metal affinitive with the toner of the present invention in addition to dimethyl (or partially containing other alkyl groups)-siloxane unit or fluorine-containing group in the molecule.

A printing plate having a toner image formed thereon is finally evaluated as regards the printing durability by practially subjecting the plate to printing. As a convenient method, however, the adhesion peeling strength of the toner with regard to the surface of the printing plate can be utilized as a criterion for evaluation of the printing durability, because there is a close relation therebetween.

The measurement of the adhesion peeling strength is carried out in the following manner. The solid image of a toner to be measured is first formed on a dry planographic printing plate and heat-treated at 160° C. for one minute to fix the toner. "Mirror-coat" paper which is the same as the substrate of the plate material is laminated on the fixed toner through a rubber latex adhesive under pressure to obtain a specimen. The specimen is subjected to a tensile strength tester to measure the adhesion upon peeling at an angle of 180°. The dry printing plate material being used for this test is one prepared under given conditions and allowed to stand for a given period of time so that its affinity with the toner is approximately constant and it exhibits average adhesion.

Printing is generally carried out by a planographic offset printing machine, but can be also carried out by a direct printing machine. The planographic offset printing machine is widely used and has three cylinders, i.e., a plate cylinder, a blanket cylinder and an impression cylinder. On the other hand, the planographic direct printing machine is composed of only two cylinders, i.e., a plate cylinder and an impression cylinder so that it is simple, but it is scarcely used, since it is very difficult to carry out conventional planographic printing using the fountain solution.

The principal reason why it is impossible to conduct direct printing with a conventional planographic plate using the fountain solution is that the balance between the fountain solution and the ink is lost since printing paper is directly contacted with the surface of the printing plate. On the other hand, when the dry planographic plate is used, the control of only ink is required so that the direct printing becomes possible. However, in the direct printing by the dry planographic plate, particularly paper plate having an electrophotographic toner image formed thereon, the printing plate is directly contacted with the printing paper and therefore a high printing durability due to adhesion between the toner and the plate is required as compared with dry offset printing through soft blanket. Therefore, a strong bonding between the toner and the surface of the dry printing plate material is highly desirable. Conventionally available toners are very unsatisfactory in respect of the printing durability even in offset printing wherein the requirement for printing durability is not so severe.

The toner of the present invention forms an image on the plate material coated with the silicone or fluorocarbon resin having the above-described composition by PPC type or CPC type electrophotographic plate making, electrostatic recording method, or the like. The fixing of the toner may be further made, if necessary. This fixing is conducted at a temperature of 100 to 300° C. for 30 min or shorter and may be conducted by convection or radiation. The resulting printing plate is then placed on an offset printing machine or a direct printing machine to carry out printing without supplying any fountain solutions. Commercially available ink formulated for the printing using fountain solutions can be used, but a specially formulated one for the dry printing is generally used.

It has been found that the toner of the present invention exhibits remarkable durability in the dry planographic printing and makes it possible to carry out the printing without undergoing any dropout of thin lines or dots, though conventional toners are poor in adhesion and unable to print a large number of copies.

The following examples will further illustrate the present invention in more detail.

EXAMPLE 1

An image was formed on a dry planographic plate material and a toner having excellent adhesion to the surface of the printing plate was prepared.

86 parts of an epoxy resin (trade name: EPIKOTE 1004, number-average molecular weight of 1600, epoxy equivalent of 875 to 975, a product of Yuka Shell Epoxy K.K.) and 100 parts of 1,4-dioxane were charged in a three-necked flask equipped with a stirrer and a thermometer and dissolved at around 80° C.

6 parts of tris(acetylacetonato)aluminum (III) (Dotite Al (III), a product of Dojin Chemical Co., Ltd.) and a solution of 4 parts of a charge controlling agent, Nigrosine dye (BONTRON N-01, a product of Orient Chemical Industries, Ltd.) dissolved in chloroform by heating were added to the above resin solution. Further, 4 parts of carbon black (trade name: MA-8, a product of Mitsubishi Chemical Industries, Ltd.) treated with a surface treating agent (trade name: ALUMICHELATE M, (alkyl acetoacetate)aluminum diisopropinate, a product of Kawaken Fine Chemicans Co., Ltd.) was added thereto. The mixture was stirred for one hour and the solvent was distilled off under vacuum to obtain a solid.

The solid was crushed into a particulate matter having a particle size of 2 mm or below, further pulverized and classified to obtain a positively chargeable toner having an average particle size of about $10\mu$. 10% by weight of the toner powder thus obtained and magnetic iron powder carrier (TEFV 250, a product of Nippon Iron Powder Co., Ltd.) were mixed together and thoroughly stirred to electrically charge the toner. This mixture (developer) was supported on a magnet and brought into contact with wood-free paper under an electrical field to obtain a deep toner image.

Fine magnetic iron oxide powder and a resin were kneaded to prepare a fine plastic carrier. This carrier and the above toner were used to form a toner image by applying them to an EP310 or EP530R copy machine (manufactured by Minolta Camera Co., Ltd.).

The fine carrier was prepared in the following manner. Fine iron oxide powder (RB-BL, average particle size of $0.5\mu$, a product of Titan Kogyo K.K.) and an epoxy resin (Epikote 1007, a product of Yuka Shell Epoxy K.K.) or a styrene resin (Piccolastic D-125, a product of ESSO Chemical Co., Ltd.) were used as main components. Appropriate qualities of them were kneaded in a solution, dried and pulverized into a fine powder having an average particle size of 20 to $30,\mu$.

About 2 to 20% of the above toner was mixed with the thus-obtained fine carrier. The mixture (developer) was charged in an EP310 or EP530R copy machine and various originals were used to conduct duplication or plate making. It was found that a clean, scumming-free image could be formed on plain paper or a dry planographic plate material. The image had a high solid density, did not have any edge effect and had good tone.

The dry planographic paper plate was composed of coated paper ("mirror coat" paper, Gold, about $150\mu$, thick, a product of Kanzaki Paper Manufacturing Co., Ltd.) coated with a silicone composition in a quantity of 3 g/m$^2$ on a dry weight basis. The silicone composition was composed of a hydroxyl group-terminated dimethylpolysiloxane, γ-glycidoxypropyltrimethoxysilane and tetrabutoxy titanate. The plate was obtained by coating the paper with the silicone composition followed by curing at 160° C. for 2 minutes.

The dry planographic paper plate having the toner image of present invention was heat-treated in an oven at 160° C. for one minute, and printing was conducted by using the resulting printing plate. For the purpose of comparison of the toner, an image was formed on the above plate material by a Xerox 3103 copy machine, the plate material was heat-treated at 160° C. for one minute and the resulting printing plate was simultaneously used to conduct the printing. The printing machine was A.B.-Dick 309 (a desktop offset printing machine having three cylinders, i.e. a plate cylinder, blanket cylinder and impression cylinder, manufactured by A.B.-Dick Co.). Dry printing was carried out using an ink suitable for dry planographic printing. It was found, as a result, that there was a great difference in the printing durability of 80 lines/inch halftone image between the toner of the present invention and that of the Xerox copy machine. That is, the Xerox toner image underwent dropout of the toner in fine dots after printing only 300 copies, while the toner of the present invention did not undergo dropout of the toner in fine dots even after printing 1000 copies.

The bonding strength of the toner to the printing plate was tested in the following manner. After a black solid image was put on the printing plate, a coated paper was laminated thereon and the laminate was fused to each other by hot pressing to prepare a specimen which was then subjected to the measurement of peeling strength. The adhesion bond peeling strength of the toner of the present invention was 85 g/cm, while that of the Xerox toner was 21 g/cm.

EXAMPLE 2

Toners were prepared by various methods described below and evaluated.

(1) Toner A

The procedure of Example 1 was repeated using the same epoxy resin as that of Example 1 except that tris(acetylacetonato)cobalt E(III) was used in place of tris(acetyacetonato)aluminum (III) to obtain a solid. In order to evaluate the toner, the solid was similarly pulverized and classified to obtain a positively chargeable toner.

(2) Toner B

In a similar manner to that described in Example 1, 74 parts of an epoxy resin (Epikote 1004) and 10 parts of tris(epoxypropyl)isocyanurate (trade name: Nissan TEPIC, a product of Nissan Chemical Co., Ltd.) were dissolved.

6 parts of cobalt acetate dissolved in an alcohol, 4 parts of Nigrosine dye (Bontron N-01) and 6 parts of carbon black treated with the surface treating agent in a similar manner to that of Example 1 were added to the above resin solution. In a similar manner to that of Example 1, the subsequent operations including pulverization and classification were conducted to obtain a positively chargeable toner.

(3) Toner C 10 parts of spiroglycol diglycidyl ether (trade name: DENACOL EX-231, a product of Nagase Chemical Ltd.) was used in place of tris(epoxypropyl)isocyanurate of toner B to obtain a positively chargeable toner.

(4) Toner D

The procedure of Example 1 was repeated except that 6 parts of zirconium hydroxyacetate was used in place of tris(acetylacetonato)aluminum (III) to obtain a positively chargeable toner.

The bonding strength of each of the toners of Examples and 2 (A to D) to the special silicone rubber-coated printing plate and their printing durability are shown in Table 1. In Comparative Examples 1 and 2, commercially available copy machines and toners for the exclusive use were used to measure the bonding strength of each toner to the special silicone rubber-coated plate material used in the Examples and evaluate their printing durability in a similar manner to that of Examples 1 and 2.

TABLE 1

| Example | Bonding strength g/cm | Printing durability[3] (copies) |
| --- | --- | --- |
| 1 | 85 | Over 1000 |
| 2 toner A | 75 | " |
| 2 toner B | 82 | " |
| 2 toner C | 88 | " |
| 2 toner D | 95 | " |
| Comp. Ex. 1[1] | 21 | 300 |
| Comp. Ex. 2[2] | 5~6 | 30 |

Note:
[1]Comparative Example 1: Toner for the exclusive use of a Xerox 3103 copy machine was used.
[2]Comparative Example 2: Toner for the exclusive use of an EP 310 copy machine was used.
[3]Printing durability was measured by forming a toner image, heat-treating the printing plate and conducting printing under the same conditions as those of Example 1.

EXAMPLE 3

86 parts of an epoxy resin (Epikote 1004) was dissolved in 1,4-dioxane. 4 parts of tris(acetylacetonato)cobalt (IV), 4 parts of a charge controlling agent (trade name: Bontron S-32, a product of Orient Chemical Industries, Ltd.) and 6 parts of carbon black (MA-100, a product of Mitsubishi Chemical Industries, Ltd.) were added to the above resin solution. After mixing, the mixture was thoroughly kneaded by a three-roll mill, and the solvent was distilled off under vacuum to obtain a solid.

In a similar manner to that of Example 1, the solid was pulverized and classified to obtain a negatively chargeable toner having an average particle size of about 9.0μ. 10% by weight of the toner powder was mixed with magnetic iron powder carrier (TEFV250/400, a product of Nippon Iron Powder Co., Ltd.). The mixture was charged in an NP5100 copy machine (manufactured by Canon Co., Ltd.) to form a toner image. The bonding strength of this toner to the above special silicone rubber-coated printing plate was 83 g/cm. An image was formed on the dry planographic paper plate by the NP5100 copy machine and heat-treated in an oven at 160° C. for one minute, and printing was conducted by using the resulting printing plate in a similar manner to that of Example 1. The printing durability was over 1000 copies. For the purpose of comparison, the toner for the exclusive use of the NP5100 copy machine was treated in a similar manner to that described above. When subjected to printing durability test, the image dropped out after printing several tens of copies.

EXAMPLE 4

This example shows the prepararation of the toner of a modified epoxy resin obtained by reacting the epoxy resin used in Example 1 with a poly-functional compound having at least two carboxyl or amino groups per molecule and the evaluation result thereof.

The resin was prepared in the following manner.

11.6 parts of maleic acid (first-class reagent grade, a product of Katayama Chemical Industries, Ltd.), 80 parts of an epoxy resin (trade name: Epikote 1004, number-average molecular weight of 1600, epoxy equivalent of 875 to 975, a product of Yuka Shell Epoxy K.K.) (the molar ratio of maleic acid to Epikote 1004 being 2:1 in this case) and 200 parts of 1,4-dioxane were charged in a three-necked flask equipped with a condenser, a stirrer and a thermometer, and reacted (0.1 part of tetraethylammonium bromide, first-class reagent grade, was added as the catalyst of this reaction) at a temperature of 105 to 115° C. for 7hrs. to prepare a maleated epoxy resin.

5.9 parts (based on the quantity of the resin component of the above reaction resin solution) of tris-(acetylacetonato)cobalt (III) (Dotite Co(III)-AA, a product of Dojin Chemical Co., Ltd.) was added to the above reaction resin solution. 24.4 parts of a colorant and charge controlling agent, Nigrosine dye (OBBY, a product of Orient Chemical Industries, Ltd.) dissolved in chloroform was then added thereto. Further, 6.1 parts of 4,4-diaminodiphenyl ether was added thereto. The mixture was stirred at 50° C. for one hour and the solvent was distilled off under vacuum to obtain a solid.

The solid was crushed into a powder having a particle size of 2 mm or below. The powder was pulverized and classified to obtain a positively chargeable toner having an average particle size of about 11μ. The toner obtained was used to form a toner image in a similar manner to that of Example 1 by using EP310. It was found that a clear, scumming-free image could be formed on plain paper and the dry planographic plate material. The image had a high solid density, did not show any edge effect and had good tone.

The printing durability and adhesion peeling strength were evaluated in a similar manner to that of Example 1 by using A.B-Dick 309, and the results of over 1000 copies and 61 g/cm were obtained, respectively.

EXAMPLE 5

Toners were prepared by the following various methods and evaluated.

(1) Toner A 19.6 parts of maleic anhydride was reacted with 16.1 parts of N-(n-butyl)diethanolamine (the molar ratio of maleic anhydride to N-(n-butyl)diethanolamine being 2:1) in a nitrogen gas atmosphere in the absence of any solvent at 120° C. for 2 hrs. to obtain a modified carboxylic acid. 80 parts of epoxy resin Epikote 1004 (the molar ratio of the modified carboxylic acid to the epoxy resin being 2:1) and 200 parts of 1,4-dioxane solvent were added to the modified carboxylic acid. The mixture was reacted under the same reaction conditions as those of Example 4 to obtain a modified epoxy resin. 4.8 parts tris(acetylacetonato)aluminum, 14.2 parts of Nigrosine dye (Bontron N-01) and 7.1 parts of diaminodiphenyl ether were added to the above reaction resin solution. The mixture was treated in a similar manner to that of Example 4 to obtain a solid which was then pulverized and classified to obtain a positively chargeable toner.

(2) Toner B 17.2 parts of anhydrous piperazine (first-class reagent grade, a product of Nakarai Chemicals Ltd.) and 106 parts of epoxy resin (Epikote 1002, number-average molecular weight of 1060, epoxy equivalent of 600 to 700, a product of Yuka Shell Epoxy K.K.) were dissolved in 250 parts of 1,4-dioxane and reacted in the presence of 0.5 part of n-propyl alcohol catalyst for 7 hrs. in a similar manner to that of Example 4, while refluxing 1,4-dioxane, to prepare a piperazine-modified epoxy resin.

5.1 parts (based on the quantity of the resin component of the above reaction resin solution) of tris-(acetylacetonato)iron (III) and 14.3 parts of Nigrosine dye (Bontron N-01) were added to the above reaction resin solution. The mixture was treated in a similar manner to that of Example 4 to obtain a solid which was then pulverized and classified to obtain a positively chargeable toner which was then tested for image evaluation.

(3) Toner C 12.9 parts of N-(2-aminoethyl)piperazine (first-class reagent grade, a product of Nakarai Chemicals, Ltd.) and 80 parts of epoxy resin (Epikote 1004) were dissolved in 250 parts of 1,4-dioxane and reacted in the presence of 0.5 part of n-propyl alcohol catalyst for 7hrs. in a similar manner to that of Example 4, while refluxing 1,4-dioxane, to prepare an amine-modified epoxy resin.

3.9 parts (based on the quantity of the resin component of the above reaction resin solution) of tris-(acetylacetonato)aluminum (III) and 10.8 parts of Nigrosine dye (Bontron N-01) were added to the above reaction resin solution. The mixture was treated in a similar manner to that of Example 4 to obtain a solid. In order to evaluate the toner, the solid was similarly pulverized and classified to obtain a positively chargeable toner.

(4) Toner D

The procedure of Example 4 was repeated except that 23.2 parts of maleic acid was reacted with 27.8 parts of 1,4-diglycidyl terephthalate (trade name: NISSAN BLEMMER DGT, a product of Nippon Oil & Fats Co., Ltd.) for about 7 hrs.while refluxing 1,4-dioxane and 80 parts of epoxy resin (Epikote 1004) was added to the resulting modified carboxylic acid to obtain a modified epoxy resin.

5.6 parts of tris(acetylacetonato)cobalt (III), 16.1 parts of Nigrosine dye (Bontron N-01) and 8.0 parts of 4,4'-diaminodiphenyl ether were added to the above reaction resin solution. The mixture was treated in a similar manner to that of Example 1 to obtain a solid. In order to evaluate the toner, the solid was similarly pulverized and classified to obtain a positively chargeable toner.

(5) Toner E

The procedure of Example 4 was repeated except that 17.2 parts of anhydrous piperazine and 27.8 parts of 1,4-diglycidyl terephthalate were dissolved in 200 parts of 1,4-dioxane and reacted in the presence of 0.5 part of n-propyl alcohol catalyst for 7hrs. while refluxing 1,4-dioxane and 53 parts of Epikote 1002 was reacted with the resulting epoxy-modified diamine solution to obtain an amine-modified epoxy resin.

4.1 parts of tris(acetylacetonato)iron (III), 11.4 parts of Nigrosine dye (Bontron N-01) and 2.3 parts of γ-aminopropyltriethoxysilane (trade name: A0750, a product of Chisso K.K.) were added to the above reaction resin solution. The mixture was treated in a similar manner to that of Example 1 to obtain a solid. In order to evaluate the toner, the solid was similarly pulverized and classified to obtain a positively chargeable toner.

(6) Toner F

The procedure of Example 4 was repeated except that 9 parts of 1,4-butanediol (a product of Nakai Chemicals, Ltd.) was reacted with 19.6 parts of maleic anhydride in the absence of any solvent at a temperature of 100 to 105° C. for one hour, 200 parts of an N,N'-dimethylformamide/1,4-dioxane solvent mixture was added thereto, stirring was conducted for 30 min and then 53 parts of Epikote 1002 was added to obtain a carboxylic acid-modified epoxy resin having dicarboxyl groups at both terminals.

3.4 parts of barium acetate, 10 parts of Nigrosine dye (Bontron N-01) and 5 parts of diaminodiphenyl ether were added to the above reaction resin solution, each quantity being based on that of the resin component of the resin solution. The mixture was treated in a similar manner to that of Example 1 to obtain a solid which was then pulverized and classified to obtain a positively chargeable toner.

(7) Toner G

The procedure of Example 4 was repeated except that 33 parts of a phenolic novolak type epoxy resin (Epikote 154) and 17.2 parts of piperazine were dissolved in 100 parts of 1,4-dioxane to prepare a piperazine-modified epoxy resin.

2.1 parts of tris(acetylacetonato)iron (III) and 5.8 parts of Nigrosine dye (Bontron N-01) were added to the above reaction resin solution. The operation of Example 1 was repeated to obtain a positive chargeable toner.

(8) Toner H

The procedure for the preparation of the toner B was repeated except that 80 parts of Epikote 1004 and 13.1 parts of triethylenetetramine (reagent grade) were dissolved in 200 parts of 1,4-dioxane to prepare an amine-modified epoxy resin.

3.9 parts of basic ferric acetate and 10.8 parts of Nigrosine dye (Bontron N-01) were added to the above reaction resin solution. The operation of Example 1 was repeated to obtain a positively chargeable toner.

(9) Toner I

The procedure for the preparation of the toner B was repeated except that 10.8 parts of m-phenylenediamine and 53 parts of Epikote 1002 were dissolved in 150 parts of 1,4-dioxane to prepare an amine-modified epoxy resin.

2.7 parts of tris(acetylacetonato)ion (III) and 7.3 parts of Nigrosine dye (Bontron N-01) were added to the above reaction resin solution. The operation of Example 1 was then repeated to obtain a positively chargeable toner.

(10) Toner J

The procedure for the preparation of the toner B was repeated except that 20 parts of 4,4-diaminodiphenyl ether and 53 parts of Epikote 1002 were dissolved in 150 parts of 1,4-dioxane to prepare an amine-modified epoxy resin.

3 parts of tris(acetylacetonato)aluminum and 8.4 parts of Nigrosine dye (Nigrosine Base EX, a product of Orient Chemical Industries, Ltd.) were added to the above reaction resin solution. The operation of Example 1 was then repeated to obtain a positively chargeable toner.

The bonding strength of each of the toners of Examples 4 and 5 (A to J) to the special silicone rubber-coated printing material and their printing durability are shown in Table 2. In Comparative Examples 1 and 2, commercially available copy machine and toners for the exclusive use thereof were used to measure the bonding strength of the toners to the same silicone rubber-coated printing plate as that of the Examples and evaluate the printing durability by using A.B.-Dick 309.

TABLE 2

| Example | Bonding strength g/cm | Printing durability (copies) |
| --- | --- | --- |
| 4 | 61 | over 1000 |
| 5 toner A | 53 | " |
| 5 toner B | 78 | " |
| 5 toner C | 70 | " |
| 5 toner D | 85 | " |
| 5 toner E | 80 | " |
| 5 toner F | 50 | " |
| 5 toner G | 60 | " |
| 5 toner H | 65 | " |
| 5 toner I | 45 | " |
| 5 toner J | 48 | " |
| Comp. Ex. 1[1] | 21 | 300 |
| Comp. Ex. 2[2] | 5~6 | 30 |

Note:
[1]Comparative Example 1: Toner for the exclusive use of a Xerox 3103 copy machine was used.
[2]Comparative Example 2: Toner for the exclusive use of an EP 310 copy machine was used.

EXAMPLE 6

The procedure of Example 4 was repeated except that 88.7 parts of maleic acid, 8.7 parts of epoxy resin (Epikote 1004) (the molar ratio of maleic acid to the epoxy resin being 2:1) and 100 parts of 1,4-dioxane solvent were used to prepare a modified epoxy resin.

3.7 parts of tris(acetylacetonato)cobalt (III), 10.2 parts of carbon black (MA100, a product of Mitsubishi Chemical Industries, Ltd.) and 2 parts of diaminodiphenyl sulfone were added to the above reaction resin solution. After mixing, the mixture was kneaded by means of a three-roll mill, and the solvent was distilled off under vacuum to obtain a solid.

In a similar manner to that of Example 4, the solid was pulverized and classified to obtain a negatively chargeable toner having an average particle size of about $9.0\mu$. In a similar manner to that of Example 3, the toner powder was charged in an NP5100 copy machine (manufactured by Canon K.K.) to conduct the formation of a toner image. The bonding strength of this toner to the above-mentioned silicone rubber-coated printing plate was 73 g/cm, and the printing durability of the dry planographic paper plate in offset printing was over 1000 copies.

EXAMPLE 7

The procedure of Example 4 was repeated except that 7.6 parts of anhydrous piperazine, 79 parts of Epikote 1004 (the molar ratio of piperazine to Epikote 1004 being 1.8:1) and 150 parts of 1,4-dioxane were used, and the reaction was carried out in the presence of 0.5 part of n-propyl alcohol catalyst for 7hrs. while refluxing 1,4-dioxane.

3.6 parts of tris(acetylacetonato)iron (III), 7.8 parts of carbon black (surface-treated in a similar manner to that of Example 1) and 2 parts of γ-amino-propyltriethoxysilane were added to the above reaction resin solution. The operation of Example 1 was then repeated to obtain a positively chargeable toner.

In a similar manner to that of Example 1, the printing durability and adhesion peeling strength were evaluated and the results of over 1000 copies and 105 g/cm were obtained, respectively.

EXAMPLE 8

A printing plate for dry planographic printing was prepared by using each of the toners prepared in the foregoing Examples and printing test was conducted by using a direct printing machine. The dry planographic paper plate had a reagent composition (U.S. Pat. No. 4,308,799) similar to that used in the foregoing Examples, and was a printing plate obtained by examining the ratio of the silicone reagent composition to be coated and preparation conditions so as to improve the bonding strength to the toner and to be suited for use in direct printing. When this printing plate was used, the printing durability in offset printing was remarkably increased so that it became difficult to make a comparison of the bonding strength and printing durability between the toners.

There was used a direct printing machine for dry planographic printing, which had two cylinders, i.e., a plate cylinder and an impression cylinder.

The image formation using each toner prepared was conducted by a Minolta EP300 RE copy machine, and the fixing of the toner imge was carried out at a printing plate temperature of about 190° C. by a lamp type fixing machine. The thus-obtained printing plate was fixed to the direct printing machine and printing was conducted with ink for dry printing. The measurement of the printing durability was made by dropout of thin line (the width of thin line in copies being $50\mu$) from the image. The results are shown in Table 3.

TABLE 3

| Toner | Printing durability (copies) by a direct printing machine |
| --- | --- |
| Ex. 1 | 450 |
| Ex. 3 | 600 |
| Ex. 5-E | 1,100 |
| Ex. 7 | 1,600 |
| Comp. Ex. 1[1] | 50 |
| Comp. Ex. 2[2] | 0 |

Note:
[1]Comparative Example 1: Toner for the exclusive use in a Xerox 3103 copy machine was used.
[2]Comparative Example 2: Toner for the exclusive use in an EP310 copy machine (manufactured by Minolta Camera Co., Ltd.) was used.

It is apparent from Table 3 that the toners of the present invention give printing plates exhibiting a remarkably high direct printing durability, while the toners for the exclusive use in the commercially available copy machines of Comparative Examples have a poor bonding strength to the dry planographic paper plate and exhibit a very poor printing durability.

There is a difference in direct printing durability between the toner group of Examples 1 and 3 and that of Examples 5-E and 7. The former group uses the un-modified epoxy resin and the latter group uses the modified epoxy resin. However, it is not clear why there is a difference in the printing durability between them.

EXAMPLE 9

20 parts of negatively chargeable toner powder having an average particle size of about $9.0\mu$ obtained in Example 6, a surfactant "Sanmolin OT-70" (a product of Sanyo Chemical Industries, Ltd.) and Isopar H (a product of Esso Chemical K.K.) were charged in a ball mill, and pulverized over a period of 72 hrs. to prepare a concentrated toner solution.

The wet toner obtained was diluted with Isopar H and charged in a Canon NP-8 copy machine to carry out an image formation test. It was found that a clear image was formed on plain paper and the silicon composition-coated plate material prepared in a similar manner to that of Example 1. The toner image formed on the plate material was fixed by further heating it at 160° C. for 3 min and then subjected to a printing test. For the purpose of comparison, on image was formed to the printing plate by using the toner for the exclusive use in a Canon NP-8 and thermally fixed.

In a similar manner to that of Example 1, printing was conducted with a specially designed ink for dry planographic printing by using an A.B-Dick printing machine. At least 700 copies with no scumming could be produced from the toner image of the present invention without causing dropout in 80 lines/inch halftone image, while dropout of the toner occurred in the toner image of NP-8 from the beginning of the printing and even 300 copies could not be printed.

It is surprising that silicone composition-coated printing plates having an excellent printing durability can be obtained even though the particle size of the wet toner is far smaller than that of the dry toner and the quantity of the wet toner deposited as image on the printing plate is far smaller than that of the dry toner. Such an excellent toner has not yet been discovered up to date.

What is claimed is:

1. A toner for use in electrophotography, which comprises:
   (A) an epoxy resin or a modified epoxy resin obtained by the reaction of an epoxy resin with a polyfunctional compound having at least two carboxyl or amino groups per molecule, and
   (B) a bivalent or polyvalent metal complex compound or a bivalent or polyvalent metal salt.

2. A toner as set forth in claim 1, wherein the epoxy resin is a bisphenol A type epoxy resin of the formula:

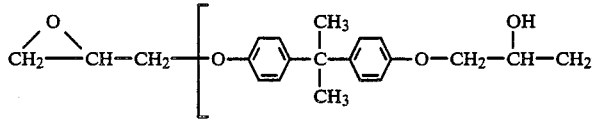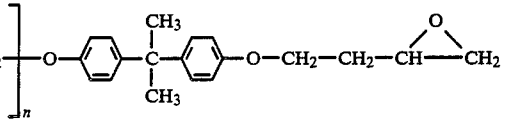

wherein n is 0 to 12, or a novolak type epoxy resin of the formula:

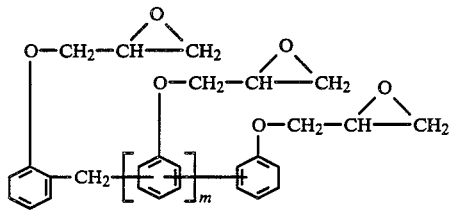

wherein m is 0 to 8.

3. A toner as set forth in claim 1, wherein the polyfunctional compound having at least two carboxyl groups per molecule is a polycarboxylic acid having 2 to 60 carbon atoms.

4. A toner as set forth in claim 1, wherein the polyfunctional compound having at least two carboxyl groups per molecule is a reaction product between a polycarboxylic acid anhydride and a polyhydric alcohol.

5. A toner as set forth in claim 1, wherein the polyfunctional compound having at least two carboxyl groups per molecule is at least one compound selected from the group consisting of maleic acid, fumaric acid, tetrahydrophthalic acid, malonic acid, chlorendic acid and a reaction product between maleic anhydride and 1,4-butanediol, N-(n-butyl)diethanolamine or 1:1 type lauric acid diethanolamide.

6. A toner as set forth in claim 1, wherein the polyfunctional compound having at least two amino groups per mole cule is a polyamine having 2 to 16 carbon atoms.

7. A toner as set forth claim 1, wherein the polyfunctional compound having at least two amino groups per molecule is at least one compound selected from the group consisting of triethylenetetramine, m-phenylenediamine, 4,4'-diaminodiphenyl ether, piperazine and N-(2-aminoethyl)piperazine.

8. A toner as set forth in claim 1, wherein the polyamine is a cyclic secondary amine.

9. A toner as set forth in claim 1, wherein the modification ratio (the molar ratio of the polyfunctional compound to the epoxy resin) is from 1.1 to 2.0.

10. A toner as set forth in claim 1, wherein the metal complex compound is an acetylacetonato metal chelate.

11. A toner as set forth in claim 1, wherein the metal salt is a metal salt of a polycarboxylic acid having 1 to 12 carbon atoms.

12. A toner as set forth in claim 1, wherein the metal is selected from the group consisting of calcium, barium, magnesium, zinc, copper, aluminum, tin, cobalt, iron, chromium, manganese, molybdenum, nickel, titanium, zirconium, lead and vanadium.

13. A toner as set forth in claim 1, wherein the ratio of component A to component B is 100: 0.5~15 by weight.

14. A toner as set forth in claim 1, wherein at least one additive selected from the group consisting of silane coupling agent, colorant and charge controlling agent is added to the toner.

15. A toner as set forth in claim 1, wherein the silane coupling agent is used in a quantity of 0.2 to 8 parts by weight per 100 parts by weight of the epoxy resin or the modified epoxy resin.

16. A process for preparing a toner for use in electrostatic photography, which comprises dissolving or uniformly dispersing in an organic solvent a composition consisting of
   (A) an epoxy resin or a modified epoxy resin obtained by the reaction of an epoxy resin with a polyfunctional compound having at least two carboxyl or amino groups per molecule, and
   (B) a bivalent or polyvalent metal complex compound or a bivalent or polyvalent metal salt, and then removing said orgnic solvent.

* * * * *